June 27, 1961 R. E. PRISTO 2,989,830
HAY CRUSHING UNIT
Filed March 19, 1959
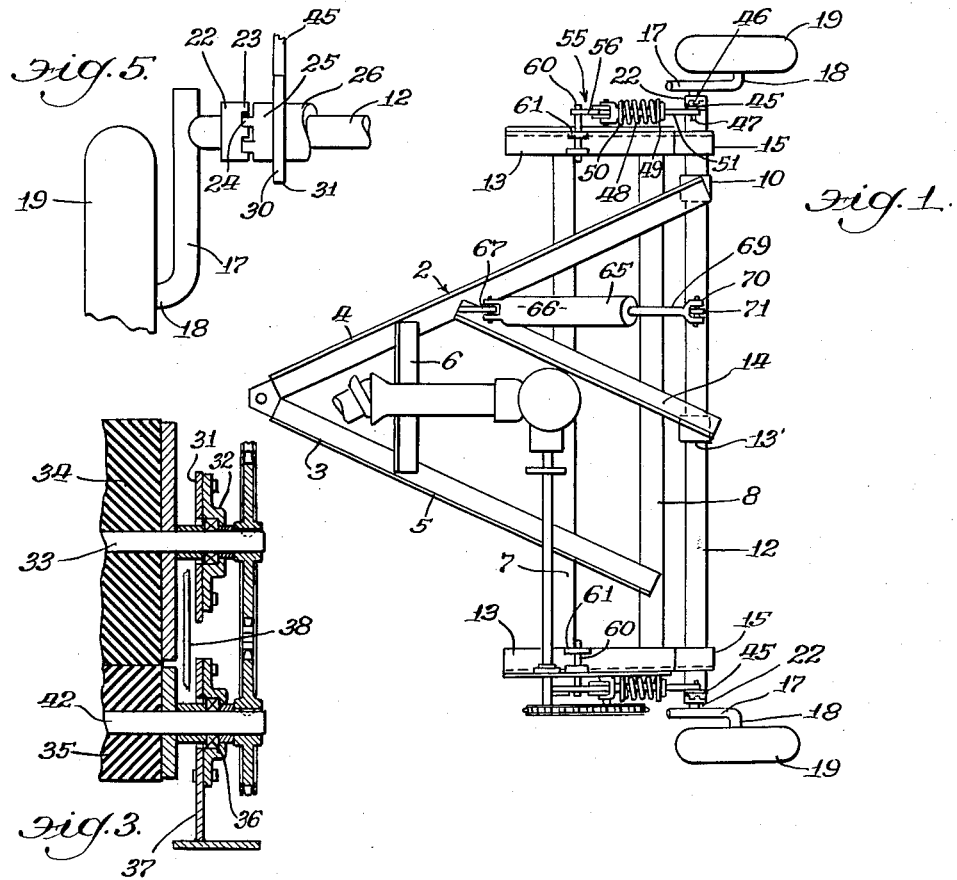
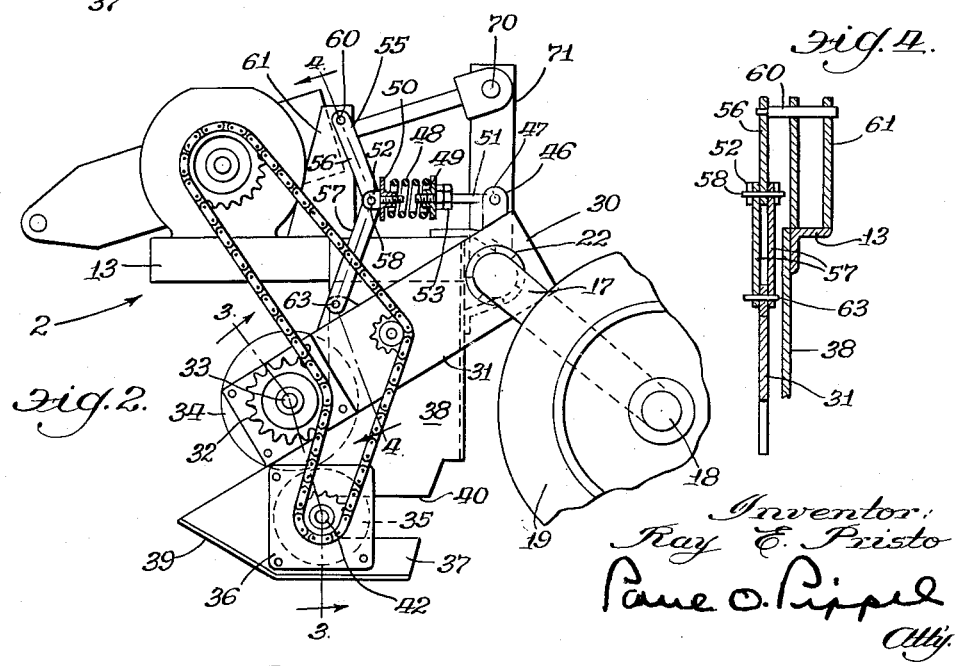
Inventor:
Ray E. Pristo
Paul O. Pippel
Atty.

United States Patent Office 2,989,830
Patented June 27, 1961

2,989,830
HAY CRUSHING UNIT
Ray E. Pristo, Cicero, Ill., assignor to International Harvester Company, Chicago, Ill., a corporation of New Jersey
Filed Mar. 19, 1959, Ser. No. 800,468
5 Claims. (Cl. 56—1)

This invention relates to apparatus for crushing hay in the field and more specifically to an actuating mechanism for closing and opening the crushing rolls.

A general object of the invention is to provide a novel crushing unit which incorporates a pair of crushing rolls one of which is stationarily mounted on the main framework of the crusher and the other being mounted by an operating mechanism on the framework for movement against and away with respect to the stationary roll, the mechanism comprising a novel linkage which is effectively employed for obtaining adequate engagement and pressure between the rolls in an effective and novel manner.

A more specific object of the invention is to provide a novel mechanism for closing and opening the crushing rolls which incorporates a toggle linkage having upper and lower links, the upper link being fixedly mounted on the stationary frame work and the lower link being connected to an arm or carrier which pivotally carries the upper roll, the toggle is being pivotally interconnected at adjacent ends and being actuated by a biasing means in the form of a spring structure and wherein the spring mechanism is actuated from a connection to the arm which mounts the movable crushing rolls so that movement of the arm to engaging position of the upper crushing roll conditions or loads the toggle by which to effect the necessary pressure for engaging the rolls against the lower crushing roll and vice-versa such that when the upper roll is moved out of engagement the spring loading is automatically reduced so that the toggle is quickly and easily broken.

These and other objects of the invention will become more apparent from the specification and the drawings, wherein:

FIGURE 1 is a plan view of a hay conditioner incorporating the novel operating mechanism;

FIGURE 2 is an enlarged side elevational view of the structure shown in FIGURE 1;

FIGURE 3 is a sectional view taken substantially in the plane indicated by the line 3—3 of of FIGURE 2;

FIGURE 4 is a sectional view as substantially shown on the line 4—4 of FIGURE 2; and FIGURE 5 is a fragmentary rear view of the structure shown in FIGURE 2 illustrating the rear mounting.

Describing the invention in detail and having particular references to the drawings, the hay crusher generally designated 2 comprises a draft frame 3 which includes a pair of rearwardly diverging side beam members 4 and 5 and an interconnecting brace 6. The beam members 4 and 5 are connected intermediate their ends to a transverse forward beam member 7 of the main frame structure of the crusher or hay conditioning unit. The rear end of beam member 5 is connected to the rear transverse member 8 whereas the beam member 4 is connected also to the beam member 8 slightly forwardly of its rear end.

The rear end of the member 4 is provided with the bearing 10 which mounts a rockshaft 12, the rockshaft 12 being supported intermediate its ends in a bearing 13' on the rear end of an auxiliary brace member 14 which projects from a point intermediate the ends of the beam member 4 generally parallel to the beam member 5 and the member 14 being connected by suitable welding or the like to said beam member 4 and to the members 7 and 8 of the main frame structure.

The main frame structure includes a pair of fore and aft extending side beam members 13, 13 or supports which interconnect the respective ends of the transverse beam members 7 and 8, the rear ends of the members 13 being provided with bearings 15 which rotatably support the rockshaft 12 adjacent to its ends.

Each end of the member 12 is provided with an integral rearwardly and downwardly projecting arm 17 which merges with an outwardly extending spindle portion 18 which mounts an associated wheel 19 on a generally horizontal transverse axis, the wheels 19 supporting the crusher.

The arms 17 as well as the ends of the tube 12 are provided with inwardly directed toothed clutches 22 which have teeth 23 fixed on tube 12 loosely meshing with teeth 24 on jaw clutches 25 provided on the ends of sleeves 26 which are rotatably mounted about the ends of the member 12 outwardly of the bearings 15 between the same and the jaw clutches 22.

Each sleeve 26 mounts and is rigidly fastened to the rear end 30 of the supporting mounting arm or carrier 31 which at its forward end carries the bearing 32 supporting the center shaft 33 of the upper crushing roll 34 which is movable about the axis of the member 12 and is movable up and down with reference to the stationary crushing roll 35 which is carried in bearings 36 mounted on the lower ends 37 of respective side panels or supports 38 of the main frame structure.

The panels 38 at their lower ends 37 are constructed to provide shoes which are angled upwardly and forwardly at their forward ends as at 39 for guiding and supporting the crushing unit in its lowered operating position. These lower portions 37 are slotted rearwardly to permit admittance of the center shaft 42 of the lower roll 35, said shaft 42 suitably mounting the lower roll on the bearings 36.

It will be readily appreciated that the arms or carriers 31 through the medium of the clutch 25 and clutch 22 is interlocked with the rock shaft 12 and since the teeth 23 and 24 are loose there is some relative play between the rockshaft and the arms so that incremental adjustment of the height of the unit is possible without affecting the pressure on the crushing rolls. The upper end 30 of each arm 31 is provided with upwardly extending arm 45 whereby in effect the arm member 31 is a bellcrank. The upper end 46 of the arm 45 is pivotally connected as at 47 to the rear end of the spring or biasing unit 48 which is in the nature of a compression spring interposed between two abutments 49 and 50 disposed in suitable adjustable relationship on the mounting rods 51 and 52 whereby the specific connection at 47 is between the arm 45 and the rear end of the rod 51. It will be seen that the load on the upper roll 34 is adjustable by the nut structure 53 threaded on the rod 51, thus determining the loading on the toggle generally designated 55.

The toggle 55 comprises upper and lower links 57 which are pivotally connected as at 58 to the forward end of the rod 52 of the biasing mechanism 48. It will be seen that the links 56 and 57 in the operating position of the hay conditioning unit diverge forwardly, that is the point 52 is before the dead center position with respect to the closed position of the rolls so that the toggle is effective as will be readily seen in FIGURE 3. The upper link 56 is pivoted as at 60 to the upper end of the anchor 61 which is integrated with the main frame structure and particularly the adjacent member 13 as seen in FIGURE 4. The lower end of the linkage 57 is pivoted at 63 to the arm 31 intermediate its ends about one third of the distance from its forward end.

In operation for opening and closing of the rolls, there is provided a hydraulic ram 65 which has a cylinder 66 pivoted as at 67 to a bracket mounted on the main frame structure at the junction of the members 14 and 4, the cylinder mounting a piston 69 which at its free end is pivoted as in 70 to an upright lever 71 which at its lower end is fixedly connected to the rockshaft 12 intermediate its ends. It will readily be appreciated that upon contraction of the ram, the arm 71 will move forwardly or in counterclockwise direction as viewed in FIGURE 2 thus rotating the rockshaft 12 and the arm 31 in a counterclockwise direction swinging the assemblies 19 rearwardly and upwardly and in effect lowering the unit to operating position. Simultaneously through engagement of the clutches 22 and 25 the arms 31 are caused to rotate downwardly and at the same time rotating the arms 45 forwardly in a counterclockwise direction compressing the units 48 thus actuating the toggle linkages 55 so as to load the arms 31 and engage the upper roll under load against the lower roll. Any further contraction of the cylinder beyond the contact of the rolls will produce height adjustment through disengagement of the clutches 22 and 25.

In order to place the unit in transport position the ram 65 is expanded whereby the rockshaft 12 rotates in a clockwise direction thus swinging the arms 31 in a clockwise direction and releasing or unloading the spring units 48 and at the same time rotating the wheel assemblies 19 downwardly and forwardly in a clockwise direction which in effect elevates the crushing unit. Thus, the crushing rolls are opened and simultaneously the spring units are unloaded so that in the transport position the hydraulic unit is assisted in not fighting the spring units 48.

I claim:

1. In a hay conditioner, having a main frame including a pair of horizontally spaced apart supports; roll mounting and adjusting mechanism, comprising a first horizontal roll journalled at opposite ends on the supports, a second roll closely paralleling the first roll and having opposite ends respectively adjacent the supports; a pair of carriers respectively adjacent the supports, each carrier, having a forward end and a rear end and journalling the second roll at the respective ends thereof, means pivotally mounting each carrier at its rear end to the frame; an upstanding arm connected to each carrier adjacent to its rear end, a toggle linkage connected between the frame and each carrier, a biasing means acting between each toggle and respective arm, and operating means operatively connected to each carrier for urging it into operative position by swinging it downwardly and closing the second roll against the first with attendant loading of the toggle through the respective arm and biasing means, said operating means operative to swing the carriers upwardly whereby moving the arms in an unloading direction with respect to the respective biasing means and unloading the associated toggle.

2. In a hay conditioner, having a main frame including a pair of horizontally spaced apart supports; roll mounting and adjusting mechanism, comprising a first horizontal roll journalled at opposite ends on the supports, a second roll closely paralleling the first roll and having opposite ends respectively adjacent the supports; a pair of carriers respectively adjacent the supports, each carrier having a forward end and a rear end and journalling at their forward ends respective ends of the second roll, at least one of the carriers having a generally vertical arm adjacent to the rear end thereof and a biasing mechanism operatively interconnected between the arm and the frame and including a toggle linkage operative between the frame and related carrier.

3. In a hay conditioner, having a main frame including a pair of horizontally spaced apart supports; roll mounting and adjusting mechanism, comprising a first horizontal roll journalled at opposite ends on the supports, a second roll closely paralleling the first roll and having opposite ends respectively adjacent the supports; a pair of carriers respectively adjacent the supports, each carrier having one end journalling the adjacent end of the second roll, means pivotally mounting the opposite ends of the carriers from the frame, a wheel assembly including a rock-shaft supporting the frame, an operative connection between the rockshaft and the carriers, a toggle linkage above each carrier having upper and lower links pivotally interconnected at adjacent ends, the upper link pivotally supported from the frame above the associated carrier and the lower link pivoted to the respective carrier intermediate its ends, a lever arm upstanding from each said carriers, and a compression spring assembly operatively interposed between each arm and the associated toggle for actuating the latter attendant to movement of the carrier to closing position of the second roll toward the first and unloading the toggle upon reverse movement of the carrier, and means for rotating the rockshaft.

4. In a hay conditioner, having a main frame including a pair of horizontally spaced apart supports; roll mounting and adjusting mechanism, comprising a first horizontal roll journalled at opposite ends on the supports, a second roll closely paralleling the first roll and having opposite ends respectively adjacent the supports; a pair of carriers respectively adjacent the supports, and each carrier pivoted at one end to the frame and at its opposite end to an adjacent end of the second roll, toggle means operatively connected between the frame and each carrier intermediate its ends, each carrier having a lever arm extension projecting from said one end thereof, biasing means reactively mounted between each toggle means and respective extension, an operating means connected to each carrier for pivoting the same into closing and release positions of the rolls with attendant loading and unloading of the biasing means.

5. A hay conditioner comprising a mobile frame, a first conditioner roll rotatably mounted in said frame, a second conditioner roll above said first roll, the axes of said rolls being substantially parallel, spring pressed toggle means between said frame and each end of said second roll urging said second roll toward said first roll, and each said toggle means comprising first and second members having remote ends and adjacent ends, means pivotally interconnecting the members at their adjacent ends, one of said remote ends operatively connected to said frame and the other of said remote ends operatively connected to said upper roll, and spring means reacting between the frame and the pivot means between the adjacent ends of said members.

References Cited in the file of this patent

UNITED STATES PATENTS

| | | |
|---|---|---|
| 917,603 | Hench | Apr. 6, 1909 |
| 2,811,819 | Heth | Nov. 5, 1957 |